United States Patent [19]  [11] 4,229,551
Straub et al. [45] Oct. 21, 1980

[54] PREPARATION OF MODIFIED POLYMERS OF N-VINYLPYRROLID-2-ONE AND THEIR USE FOR THE PREPARATION OF POLYMERS INTERRUPTED BY BRIDGE MEMBERS

[75] Inventors: Ferdinand Straub, Hockenheim; Herbert Spoor, Limburgerhof; Claus Cordes, Weisenheim am Berg, all of Fed. Rep. of Germany

[73] Assignee: BASF Aktiengesellschaft, Fed. Rep. of Germany

[21] Appl. No.: 56,136

[22] Filed: Jul. 9, 1979

[30] Foreign Application Priority Data

Jul. 17, 1978 [DE] Fed. Rep. of Germany ....... 2831335

[51] Int. Cl.² .............................. C08f 8/04; C08f 8/42; C08f 8/00
[52] U.S. Cl. .................... 525/337; 525/123; 525/256; 525/262; 525/285; 525/359; 525/363
[58] Field of Search ................... 525/337, 363

[56] References Cited

U.S. PATENT DOCUMENTS 4,123,396  10/1978  Rembaum et al. ................... 525/337
4,139,688   2/1979  Dixon ................................... 525/354

FOREIGN PATENT DOCUMENTS 1541670  3/1979  United Kingdom .

*Primary Examiner*—William F. Hamrock
*Attorney, Agent, or Firm*—Keil & Witherspoon

[57] ABSTRACT

A process for the preparation of modified poly-N-vinyl-pyrrolid-2-one containing two identical reactive groups, wherein polyvinylpyrrolidone is treated with complex hydrides, with or without further reaction of the modified polyvinylpyrrolidone with a reactive bifunctional compound, to give a polymer which has a molecular weight at least 2.5 times as great as that of the starting polymer.

5 Claims, No Drawings

PREPARATION OF MODIFIED POLYMERS OF N-VINYLPYRROLID-2-ONE AND THEIR USE FOR THE PREPARATION OF POLYMERS INTERRUPTED BY BRIDGE MEMBERS

The present invention relates to a process for the preparation of modified polymers of N-vinylpyrrolid-2-one by treating N-vinylpyrrolid-2-one, which has been polymerized by means of hydrogen peroxide, with a complex hydride.

The invention further relates to the use of the modified polymers thus obtained as starting materials for the preparation of polymers which are interrupted by bridge members and have a molecular weight which is more than 2.5 times as great as that of the starting polymers.

N-Vinylpyrrolid-2-one—hereafter also referred to simply as "vinylpyrrolidone"—is usually polymerized by a free radical process in aqueous solution, using hydrogen peroxide. Other polymerizable compounds, which copolymerize with vinylpyrrolidone and give random copolymers, may also be present during the free radical polymerization.

Methods of preparing block polymers from poly-N-vinylpyrrolid-2-one are not well-known. However, such products are more advantageous for certain applications than purely random copolymers.

Block polymers may be prepared by various methods. In one method, another monomer can be grafted onto a vinylpyrrolidone polymer by free radical polymerization or possibly by ionic polymerization; in another method, a vinylpyrrolidone polymer possessing functional groups at the chain ends can be subjected to a polycondensation or polyaddition reaction. In this case, the term "polycondensation product or polyaddition product" will be used in addition to the term "block polymer".

In using a free radical polymerization to prepare a vinylpyrrolidone polymer suitable for subsequent polycondensation or polyaddition there is, however, the difficulty of obtaining equivalent reactive end groups (for example hydroxyl groups) at each polymer chain end because, in fact, in the free radical polymerization of vinylpyrrolidone the end groups, resulting from a variety of chain termination reactions, are very diverse.

German Laid-Open Application DOS No. 2,646,675 describes a process which gives a polyvinylpyrrolidone polymer alleged to carry a hydroxyl group at each end of the chain. However, we have found that such a polymer is unsuitable for condensation reactions or addition reactions leading to products of higher molecular weight. The hydroxyl number of such polymers measured according to DIN 53,240, is much too low, and furthermore the reaction with compounds carrying reactive groups does not give any condensation products containing more than 2 vinylpyrrolidone polymer blocks, ie. the molecular weight of the condensation products is at most twice as great as that of the unmodified vinylpyrrolidone polymer. In other words, there can be on average at most one terminal hydroxyl group present per macromolecule.

However, in order to obtain condensation products of higher molecular weight from vinylpyrrolidone polymers, more than 2 vinylpyrrolidone polymer blocks must be introduced into the molecule. To do this, the polymer must possess terminal groups of equal reactivity at each chain end. Of course, these functional groups in the copolymer can also be obtained by copolymerizing vinylpyrrolidone with comonomers carrying functional groups. This, however, has the disadvantage that the comonomers are copolymerized only in random distribution and therefore in part give cross-linked instead of linear block polymers. If, on the other hand, equivalent functional groups are bound to each chain end, polycondensation or polyaddition gives a linear condensation product containing more than 2 polymer blocks.

Furthermore, a vinylpyrrolidone polymer which carries groups of identical reactivity at each chain end has the advantage that definite amounts of other low molecular weight compounds, for example antioxidants, preservatives, dyes, drugs and the like, can also be attached to the polymer.

A polyvinylpyrrolidone prepared in the conventional manner by polymerization in aqueous solution, using hydrogen peroxide, and also the polymer prepared according to German Laid-Open Application DOS No. 2,646,675, in particular Example 1, do not exhibit the desired properties. Polycondensates or polyaddition products prepared therefrom give a condensation product which at most consists of 2 polymer blocks and contains one bridge member.

Particularly when starting from low molecular weight polyvinylpyrrolidone it is necessary, as stated above, to seek to obtain, from such condensation or addition reactions, products which have a molecular weight which is at least 2.5 times as great as that of the starting polymer.

It is an object of the present invention to provide a process whereby polyvinylpyrrolidone (hereafter also referred to as PVP) can be modified in such a way that it contains two identical reactive groups, so as to be able to prepare condensation products containing more than two polymer blocks, which can therefore have a molecular weight which is more than 2.5 times as great as that of the starting polymer.

We have found that this object is achieved by a process for the preparation of a modified poly-N-vinylpyrrolid-2-one which contains 2 identical reactive groups in the molecule, wherein a polymer obtained by free radical polymerization of N-vinylpyrrolid-2-one in the presence of hydrogen peroxide as the free radical initiator is treated with a complex hydride.

The process gives a modified PVP which contains two identical reactive groups at the ends of the polymer chain and with which—in contrast to the hydroxyl-containing PVP described in German Laid-Open Application DOS No. 2,646,675—polycondensation products and polyaddition products can be prepared. For the purposes of the invention, the expression "reactive groups" means groups which may be formed by virtue of the chemical nature of the complex hydride used and of the solvent used, ie. ether groups and especially hydroxyl groups.

The starting compound is a PVP which is obtained by conventional polymerization of N-vinylpyrrolid-2-one in the presence of hydrogen peroxide, in aqueous solution. These operations are known and do not require further explanation—reference may be made, for example, to the monograph by W. Reppe "Polyvinylpyrrolidon" Verlag Chemie GmbH, Weinheim/Bergstrasse.

The polymers should in general have a K value of from 10 to 100, preferably from 10 to 30; higher and lower K values do not interfere with the process but also do not offer any additional advantages.

According to the invention, the polymers are treated with complex hydrides, using from 0.1 to 10%, preferably from 0.5 to 5%, based on the weight of the polymers. For the purposes of the invention, complex hydrides are in particular those derived from hydrides of metals of main group 3 of the periodic table, particularly of boron and aluminum, in which the central atom has a coordinative valency of 4 and an alkali metal ion, particularly a lithium ion, sodium ion or potassium ion, is present as the counter-cation.

Preferred hydrides are those which, as in the case of sodium boranate and lithium boranate, are water-soluble, but the reaction can also be carried out with others, such as $NaBH(OCH_3)_3$, $NaAlH_4$, $LiAlH_4$, $NaAlH_2(OCH_2OCH_3)_2$ or $LiAlH[OC(CH_3)_3]$. The highly reactive complex hydrides are employed in amounts which are sufficiently low that the lactam group of the polyvinylpyrrolidone is not attacked.

The reaction with the complex hydrides is, where possible, carried out in water; this is feasible with lithium boranate and sodium boranate. In the case of the other complex hydrides, it is advantageous to use a solvent such as a lower alcohol, eg. methanol, ethanol, isopropanol, n-propanol, n-butanol or tert.-butanol, an ether, eg. dioxane or tetrahydrofuran, or an aromatic, eg. benzene, toluene or xylene. The reaction is carried out at from 1° to 150° C., preferably from 15° to 80° C., the temperature depending on the boiling point of the solvent. If the reaction is carried out in an aqueous or alcoholic solvent, the pH is in general brought to about 7 before the reaction. The reaction time varies from 0.5 to 24 hours, preferably from 2 to 8 hours. If the polyvinylpyrrolidone contains carboxyl groups, it can be advantageous to esterify these by conventional methods before carrying out the reaction with a hydride.

To remove any impurities which may be present in the polymer, it has proved very useful to pass the polymer solution over an ion exchanger before or after the reaction with a complex hydride. Examples of suitable ion exchangers are those based on polystyrene and containing sulfo, carboxyl or quaternary ammonium groups, and those based on acid or basic silicates. Amongst the former category, specific examples are the products marketed under the registered tradmarks ®AMBERLITE (Rohm & Haas) and ®LEWATIT (Bayer AG).

It is particularly preferred to carry out the purification after the reaction with the complex hydrides, since in that way the impurities formed as a result of this reaction are also removed. Polymers additionally treated in this way exhibit a substantially increased reactivity, compared to the unpurified polymers, in the polycondensation or polyaddition reaction (see below).

Surprisingly, the vinylpyrrolidone polymers modified according to the invention are capable—in contrast to the prior art polymers—of reacting with compounds carrying two reactive groups, to give linear polycondensation products or polyaddition products which have a molecular weight which is more than 2.5 times as great as that of the modified PVP before the reaction.

For the purposes of the invention, bifunctional compounds carrying reactive groups are carboxylic acid derivatives or isocyanates, for example acid halides of dicarboxylic acids, eg. phosgene, oxalyl chloride, malonyl chloride, succinyl chloride, glutaric acid dichloride, sebacic acid dichloride, phthalic acid dichloride and terephthalic acid dichloride, and diisocyanates, eg. toluylene diisocyanate, hexamethylene diisocyanate and methylene-bis-cyclohexylene diisocyanate.

The resulting materials are linear polyvinylpyrrolidone polycondensation products which contain ester or urethane groups as bridge members between the PVP blocks.

The linkage of the modified PVP by means of the bifunctional compounds, ie. the polycondensation or polyaddition, is preferably carried out in an anhydrous solvent in order to avoid the formation of by-products (acid halides and isocyanates react with water to form carboxylic acids and urea derivatives respectively). Suitable solvents are those which readily dissolve PVP and do not themselves react with carboxylic acid derivatives or isocyanates. Aprotic solvents, eg. N-methylpyrrolidone, dimethylsulfoxide, dimethylformamide, toluene and chlorohydrocarbons, are preferred.

To carry out the reaction, the components can be mixed, or one component can be metered into the solution of the other. After the reaction, the solvent can be removed by distillation or steam distillation, or by precipitating the polycondensation or polyaddition products.

The products are particularly useful in the pharmaceutical sector because, in contrast to the conventional vinylpyrrolidone polymers, they exhibit substantially improved biological degradability in the human body. They are therefore useful pharmaceutical assistants, for example blood plasma substitutes.

The Examples which follow illustrate the invention.

In the Examples, parts are by weight, unless expressly stated otherwise, and bear the same relation to parts by volume as the gram to the ml. The K values were determined according to Cellulosechemie, 13, 58–64 (1932) (on 1% strength aqueous solutions at 20° C.).

EXAMPLE 1

100 parts of polyvinylpyrrolidone (K value 30, hydroxyl number 18) are dissolved in 300 parts of water, the pH is brought to 9 with 2 parts by volume of 25% strength sodium hydroxide solution, and 0.5 part of sodium boranate is added. The mixture, which froths slightly, is stirred for 5 hours at room temperature. The polymer solution is then freeze-dried. The polymer obtained has a hydroxyl number of 42.

EXAMPLE 2

500 parts of vinylpyrrolidone are dissolved in 400 parts of water, 1 part of 0.01% strength copper chloride solution and 125 parts of 30% strength hydrogen peroxide are added and polymerization is carried out for 7 hours at 70° C. 27 parts by volume of 25% strength ammonia are metered in during the polymerization in order to maintain a pH of 7.5.

25 parts of sodium boranate are added in portions to the polymer solution at room temperature, and the mixture, which froths vigorously, is stirred for 5 hours. After standing overnight, the solution is purified by ion exchange treatment with 2,000 parts by volume of Lewatit S 100 and 2,000 parts by volume of Lewatit M 500. After freeze-drying, the polymer has a K value of 12, a pyrrolidone content of 3.5% and a hydroxyl number of 81.

EXAMPLE 3

(a) 750 parts of vinylpyrrolidone are dissolved in 250 parts of water, 0.5 part of 0.01% strength copper-II chloride solution and 30 parts of 30% strength hydrogen peroxide are added and the mixture is polymerized for 6 hours at 70° C. and a pH of 7.6. The polymer solution is freeze-dried; the resulting polymer has a K value of 17, a pyrrolidone content of 5.9% and a hydroxyl number of 38.

(b) 100 parts of this polymer are dissolved in 160 parts of water, the solution is brought to pH 7.5 with 10 parts by volume of ammonia, and 2 parts of sodium boranate are added in portions. Whilst it froths (for about 1 hour) the mixture is stirred at room temperature; it is then left to stand overnight, after which it is purified over 2,000 parts of Lewatit S 100 and 2,000 parts of Lewatit M 500. The solution is then freeze-dried. The polymer has a pyrrolidone content of 1.3% and a hydroxyl number of 48.

EXAMPLE 4

200 parts of polyvinylpyrrolidone obtained as described in Example 3a) are dissolved in 250 parts by volume of ethanol and in order to esterify any carboxyl groups diazomethane is added until a yellow coloration persists. The mixture is left to stand for 2 days at room temperature, the ethanol is removed by steam distillation and the aqueous solution is dried in a spray dryer. 140 parts of polymer are obtained; 50 parts thereof are dissolved in 225 parts of dioxane and 0.5 part of sodium boranate and 1.15 parts of lithium bromide are added (the ultimate result being that lithium boranate is the reagent). A smeary cloudy mixture is formed which is left to stand overnight; 80 parts of water are then added and the dioxane is removed by steam distillation. The aqueous solution is dialyzed for one week against fully demineralized water, using a dialysis apparatus and membrane filter. The dialyzed solution is freeze-dried. The polymer has a hydroxyl number of 69.

EXAMPLE 5

100 parts of a polymer prepared as described in Example 3 are dissolved in 300 parts of dimethylformamide. 100 parts of dimethylformamide are distilled off in a water-pump vacuum. The mixture is allowed to cool and 12 parts of hexamethylene diisocyanate are then added. After having stood overnight, the polymer is precipitated by adding the solution dropwise to 2,000 parts by volume of diethyl ether. At this stage, the polymer has a K value of 27.9 (measured in a 5% strength solution in water). The starting material (K value 17) is found to have a molecular weight of 9,335, whilst the polyaddition product formed (K value 27.9) has a molecular weight of 41,263, corresponding to an increase in molecular weight by a factor of 4.4.

EXAMPLE 6

The procedure followed is as described in Example 5, but toluylene diisocyanate is used instead of hexamethylene diisocyanate. The polyaddition product has a K value of 24.3, corresponding to a calculated molecular weight of 27,262 and hence to an increase in molecular weight, compared to that of the starting material, by a factor of 2.9.

EXAMPLE 7

100 parts of a polymer prepared as described in Example 3 are dissolved in 300 parts by volume of chloroform; water is removed by circulatory distillation. The solution is allowed to cool and 12 parts of adipic acid dichloride are added slowly, at room temperature. The mixture is stirred for 4 hours and is then added dropwise to 2,000 parts by volume of diethyl ether to precipitate the polymer. The polycondensation product has a K value of 23.4 (measured in a 5% strength solution in dimethylformamide), which corresponds to a calculated molecular weight of 24,344 and means that the molecular weight has been increased by a factor of 2.6.

EXAMPLE 8

The procedure followed is as described in Example 7, except that instead of adipic acid dichloride oxalyl chloride is added. The resulting polycondensation product has a K value of 23.8, which corresponds to a calculated molecular weight of 25,615 and hence to an increase in molecular weight by a factor of 2.75.

COMPARATIVE EXAMPLE 1

100 parts of polyvinylpyrrolidone (K value 17.5), prepared by conventional polymerization in water with hydrogen peroxide as the initiator are dissolved in 300 parts of dimethylformamide. 100 parts of dimethylformamide are then distilled off under reduced pressure; when the mixture has cooled, 12 parts of toluylene diisocyanate are added. The mixture is left to stand overnight and is then added dropwise to 2,000 parts by volume of diethyl ether, to precipitate the polymer. The addition product has a K value of 20.1 (measured in a 5% strength solution in water), corresponding to a calculated molecular weight of 15,300. The calculated molecular weight of the starting polymer (K value 17.5) is 10,300; accordingly, the molecular weight of the addition product is 1.5 times higher.

COMPARATIVE EXAMPLE 2

This and the following Comparative Example are intended to show that vinylpyrrolidone polymers obtained by other polymerization methods can not be converted into polyaddition or condensation products with molecular weights substantially above 1.5 times that of the starting polymer.

100 parts of polyvinylpyrrolidone (K value 14.3), prepared in ethanol as the solvent, in the presence of dibutyl peroxide, as described in German Laid-Open Application DOS No. 2,514,127, are dissolved in 300 parts by volume of methylene chloride and the water is removed by distillation. When the solution has cooled, 12 parts by volume of succinic acid dichloride are added. The mixture is left to stand overnight and is then poured into 2,000 parts by volume of ether to precipitate the polymer. The latter is dissolved in 200 parts by volume of water and the solution is neutralized with sodium bicarbonate; the condensation product has a K value of 16.2, which corresponds to an increase in molecular weight by a factor of 1.45.

COMPARATIVE EXAMPLE 3

100 parts of N-vinylpyrrolidone, 500 parts of water and 1.5 parts of borax are mixed and the polymerization is carried out by the method disclosed in German Laid-Open Application DOS No. 2,646,675, Example 1. The polymer is precipitated by pouring the aqueous solution into acetone, and is dried overnight. It has a pyrrolidone content of 0.94%, a hydroxyl number of 11 and a K value of 47.7 (measured in a 1% strength solution in water), which corresponds to a calculated molecular weight of 206,209.

50 parts of this polymer are dissolved in 300 parts of dimethylformamide and 100 parts of dimethylformamide are then distilled off under reduced pressure. When the solution has cooled, 1.4 parts of toluylene diisocyanate (corresponding to the hydroxyl number) are added. The mixture is left to stand overnight and is then added dropwise to 2,000 parts by volume of ether to precipitate the polymer. The block polymer has a K value of 54.6, which corresponds to a calculated molecular weight of 309.914 and to an increase in molecular weight by a factor of 1.5.

We claim:

1. A process for the preparation of a modified poly-N-vinylpyrrolid-2-one which carries 2 identical reactive groups in the molecule, wherein a polymer obtained by free radical polymerization of N-vinylpyrrolid-2-one in the presence of hydrogen peroxide as the free radical initiator is treated with a complex hydride derived from hydrides of boron and aluminum and an alkali metal ion.

2. A process as claimed in claim 1, wherein a polymer having a Fikentscher K value of from 10 to 30 is employed.

3. A process as claimed in claim 1 or 2, wherein lithium boranate or sodium boranate is employed as the complex hydride.

4. A process as claimed in claim 1 or 2, wherein the N-vinylpyrrolid-2-one polymer is purified over an ion exchanger before or after its reaction with the complex hydride.

5. A process as claimed in claim 4, wherein lithium boranate or sodium boranate is employed as the complex hydride.

* * * * *